G. W. RISSLER.
NUT LOCK.
APPLICATION FILED JUNE 18, 1917.
1,290,357.
Patented Jan. 7, 1919.
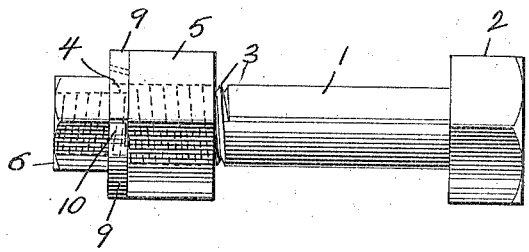
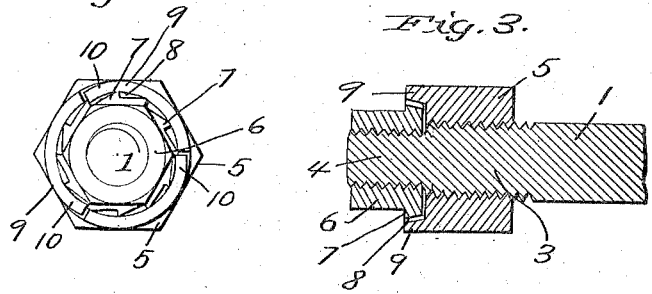
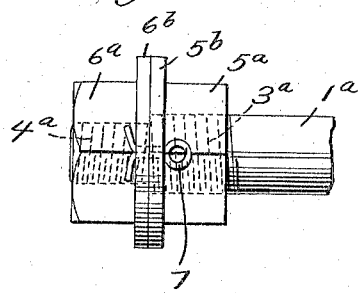
WITNESSES
INVENTOR
George W. Rissler,
BY
ATTORNEY

UNITED STATES PATENT OFFICE.

GEORGE W. RISSLER, OF CASPAR, WYOMING.

NUT-LOCK.

1,290,357.      Specification of Letters Patent.      Patented Jan. 7, 1919.

Application filed June 18, 1917. Serial No. 175,493.

*To all whom it may concern:*

Be it known that I, GEORGE W. RISSLER, citizen of the United States, residing at Caspar, in the county of Natrona and State of Wyoming, have invented certain new and useful Improvements in Nut-Locks, of which the following is a specification.

This invention relates to nut locks.

One of the main objects of the invention is to provide a nut lock of simple construction and operation which is composed of minimum parts and may be produced at very small cost.

A further object is to provide a nut lock composed, broadly stated, of a bolt having two oppositely threaded portions and nuts threaded on the bolt and secured together in such a manner as to prevent relative movement between the same.

A still further object is to provide simple and efficient means for securing the locking nuts together.

Further objects will appear from the detailed description.

In the drawings:

Figure 1 is a side view of a nut lock constructed in accordance with my invention.

Fig. 2 is an end view of the same.

Fig. 3 is a central sectional view through the lock.

Fig. 4 is a side view of the modified form.

The shank or stem 1 of bolt 2 is provided with an inner portion 3 having a right-hand thread, and novel reduced portion 4 having left-hand thread. A nut 5 is turned onto the right-hand threaded portion 3, a smaller nut 6 being turned onto the left-hand threaded portion 4. Nut 6 is provided, at its inner end, with an annular flange 7 provided with a plurality of ratchet teeth 8. These ratchet teeth are adapted to be engaged by a plurality of arcuate locking springs 9 on the outer face of nut 5. Each of these springs has its end portion which engages with the ratchet teeth of flange 7 slightly undercut to provide an integral resilient locking finger 10. The fingers 10 are directed contra-clockwise, the ratchet teeth 8 of flange 7 being directed clockwise.

In using this lock, nut 5 is first threaded onto the bolt 2 to the desired extent. The outer nut 6 is then threaded on to the reduced portion 4 of the bolt until the inner face thereof is in tight engagement with the outer face of nut 5. The resilient locking fingers 10 permit nut 6 to be turned in a contra-clockwise direction so as to be brought closely adjacent nut 5, but effectually prevent reverse rotation of the outer nut. As the nuts 5 and 6 are oppositely threaded, and are secured against relative movement when in operative position, it will be evident that neither of the nuts can be rotated after they are thus locked together so that they are, in this manner, effectually locked on the bolt.

In the modified form illustrated in Fig. 4, the bolt 1ª is provided with the inner right hand threaded portion 3ª and the outer reduced left-hand threaded portion 4ª. The inner nut 5ª is provided, at its outer end, with an annular flange 5ᵇ. The outer nut 6ª is provided at its inner end with an annular flange 6ᵇ. The flanges 5ᵇ and 6ᵇ are provided with suitable openings which may be brought into alinement to receive a cotter-pin 7, or other suitable securing member inserted through the same. By this means relative movement between the nuts is prevented so that they are locked on the bolt 1ª in the same manner as in the form originally described.

What I claim is:

1. In nut locks, a bolt having contiguous oppositely threaded portions, a nut threaded on the inner portion of the bolt and provided with an upwardly extending annular flange, a nut threaded on the outer portion of the bolt having an outwardly extending annular flange which is adapted to be seated within the first mentioned flange, said upwardly extending flange being split to provide a plurality of integral resilient locking fingers, and the said outwardly extending flange having its outer periphery provided with a plurality of ratchet teeth adapted to receive the locking fingers of the first mentioned nut thus holding the nuts in a locked position.

2. In nut locks, a bolt having two contiguous oppositely threaded portions, a nut threaded on the inner portion of the bolt and provided with an annular flange, said flange being splitted and slightly undercut to provide integral resilient locking fingers, a nut threaded on the outer portion of the bolt, and said nut having an annular flange provided with a plurality of ratchet teeth adapted to engage the locking fingers of the first mentioned nut, thus holding the nuts in a locked position.

In testimony whereof I affix my signature in presence of two witnesses.

GEORGE W. RISSLER.

Witnesses:
E. RICHARD SHIPP,
D. L. SHIPP.

Copies of this patent may be obtained for five cents each, by addressing the "Commissioner of Patents, Washington, D. C."